United States Patent Office 3,498,122
Patented Mar. 3, 1970

3,498,122
STATIONARY TEST-BENCH FOR AUTOMOBILE VEHICLES
Jean Odier, 100 Avenue Aristide Briand, 92 Antony, France, and Aymar Lefrançois, 10 Rue Lamartine, Geneva, Switzerland
Filed Jan. 18, 1968, Ser. No. 698,919
Claims priority, application France, Jan. 24, 1967, 92,217; Dec. 27, 1967, 133,850
Int. Cl. G01m *15/00;* G01l *5/28*
U.S. Cl. 73—117        11 Claims

ABSTRACT OF THE DISCLOSURE

A stationary test-bench especially intended for braking tests of automobile vehicles, comprising four rollers each supporting one wheel of the vehicle to be tested, all said rollers being driven at the same speed by the driving wheels of the vehicle, the mass equivalent to the total inertia of the rollers about their axes of rotation simulating the mass of the vehicle; an adjustable positioning device to maintain the centre of gravity of the vehicle in a fixed transverse vertical plane so as to fix the longitudinal position of the vehicle on the test-bench while permitting the vehicle to retain its other degrees of freedom of movement; and means for measuring all the forces acting between the wheels of the vehicle and the rollers.

---

The present invention, due to the work of Mr. Jean Odier, of the Societe Anonyme Francaise du Ferodo and Mr. Aymar Lefrancois, at the Institut Battelle, has for its object a fixed test-bench for automobile vehicles, intended especially for braking tests.

Tests of automobile vehicles on the road, such as are usually carried out, have a number of disadvantages, and in particular that of being dangerous at high speed and that of not permitting adequate measurements to to taken. Known test-benches have not however made it entirely possible to carry out tests under conditions comparable with those of the vehicle running on the road.

One known type of braking test-bench comprises a rolling track consisting of four pairs of rollers, each intended to carry one wheel of the vehicle, the diameter of these rollers being small with respect to that of the wheels. The distance apart of the rollers and the raising of the rear roller of each pair are provided in such manner as to position the wheel longitudinally, the latter thus remaining in contact with the two rollers during braking.

All the rollers are driven by the driving wheels of the vehicle through intermediary of an appropriate coupling. During the braking, the four pairs of rollers can be de-coupled in order to permit the determination of the braking forces on each of the wheels, and this determination is made from measurements of the decelerations of the respective pairs of rollers.

The positioning of the wheels in the longitudinal direction by means of pairs of rollers deforms however the system of forces acting on the wheel during braking. The phenomena of load-shedding are not reproduced in this type of bench, and the couples which could be created by asymmetry of braking have no effect on the vehicle. As the simulation is very incomplete with this bench, the forces measured during the tests will only correspond in a very inaccurate manner to the real forces applied to the vehicle as it runs on the road.

In other test-benches comprising rollers which form a rolling track, positioning systems of the cable type are employed for example, in order to obtain a longitudinal abutment effect. However, the known positioning systems modify the forces acting on the vehicle during the test as compared with those acting on the vehicle when travelling on the road, and in consequence do not provide an exact simulation of the various conditions of operation of the vehicle on the road.

One of the objects of the present invention is a test-bench which provides complete and exact simulation of the various conditions of running and in particular those of the braking of a vehicle on the road, in order to permit the measurement of all the forces applied by the ground on the wheels of the vehicle.

A test-bench according to the present invention is especially characterized by the fact that it comprises four rollers arranged in such manner that they can each carry, preferably on their upper generator lines, one of the wheels of the vehicle intended to be put under test, that all these rollers may be driven at equal speeds by the driving wheels of the vehicle, and that the mass equivalent to the total inertia of these rollers and their equipment round their axes of rotation are equal to the mass of the said vehicle, and by the fact that it comprises an adjustable positioning system capable of maintaining the center of gravity of the vehicle in a fixed transverse vertical plane, in order to position it longitudinally on the bench, at the same time allowing it to retain its other degrees of freedom of movement, and to permit the measurement of all the forces acting between the wheels of the said vehicle and the rollers.

The accompanying drawings show diagrammatically and by way of example, forms of construction of a test-bench in accordance with the invention.

Reference will first be made to FIGS. 1 to 4, which are concerned with a first form of construction of a test-bench according to the invention.

Figure 1:
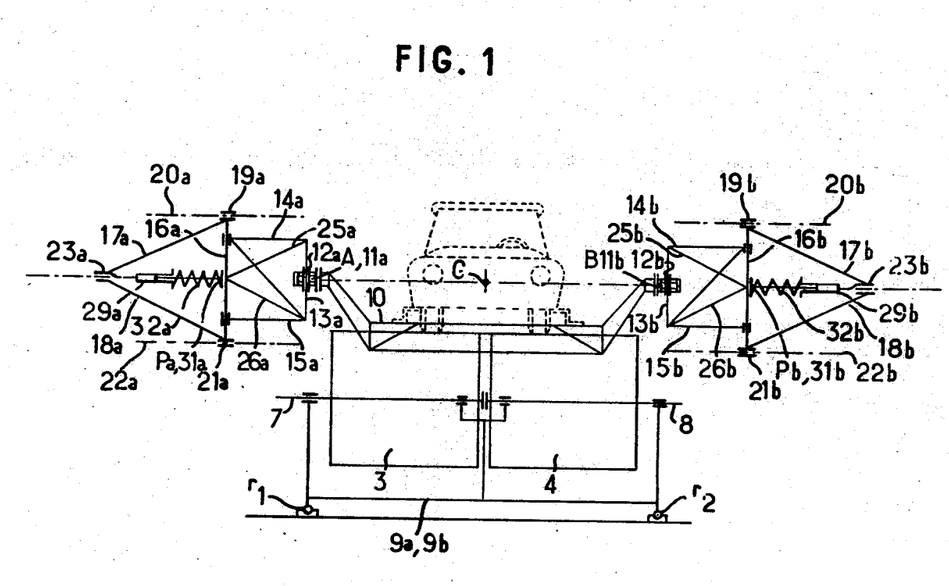
FIG. 1 is a diagrammatic front view of the test-bench according to one form of construction.
Figure 2:
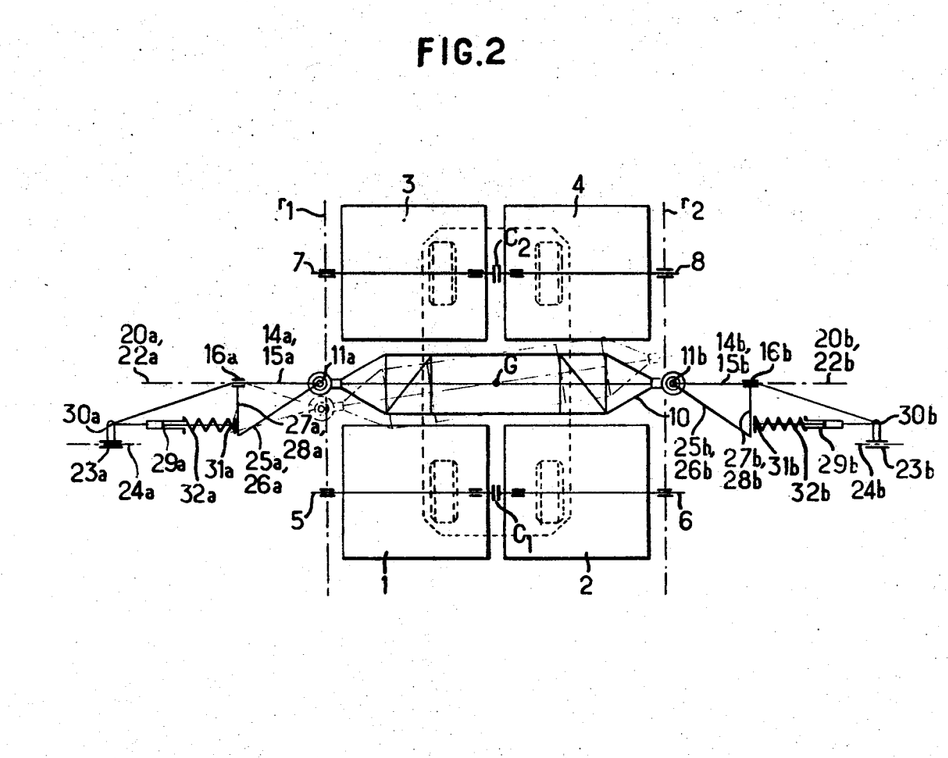
FIG. 2 is a view from above of the bench shown in FIG. 1.
Figure 3:
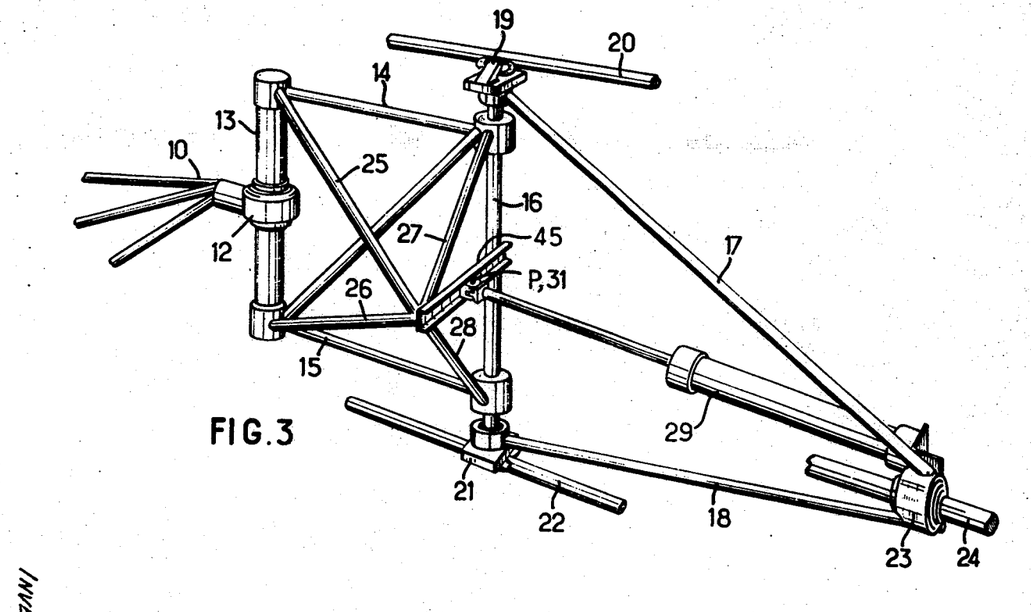
FIG. 3 gives a perspective view of a detail of FIGS. 1 and 2.

As can be seen from FIGS. 1 and 2, the test-bench comprises four metal rollers 1, 2, 3 and 4, for example of steel and of large diameter, for example 1.80 m., forming a rolling track and each intended to support one wheel of the vehicle which it is desired to test. These rollers 1 to 4 are mounted respectively on rotating horizontal shafts arranged in pairs 5, 6 and 7, 8 on two identical trolleys 9a, 9b capable of moving along a rolling track $r_1$, $r_2$, in order to permit the adaptation of the position of the rollers 1 to 4 to the wheel-base of the vehicle in its "normal" position shown in broken lines.

As can be seen from FIG. 2, in the said normal position, the axis of rotation of each wheel of the vehicle is located in the same vertical plane as that of the roller on which it is supported.

The rolling track is intended to be driven by the driving wheels of the vehicle during the test and this drive is effected in such manner that the peripheral speeds of the rollers 1 to 4 are at every instant equal to those of the said wheels. To this end, the rolling track is provided with coupling means (not shown) for the rollers. In addition, the total inertia of this track around the axes of rotation of the rollers 1 to 4 must be equivalent to the mass of the vehicle.

In this way, running on the road is simulated, and the vehicle is held in position on the rollers by a positioning system described below, while transmitting to these rollers the power developed by the motor or taking-off from these latter the energy absorbed by the brakes, so that, for each speed of the driving wheels, the kinetic energy of the rolling track is substantially equal to that which the vehicle would have when running on a road.

In the simplest case where the bench would be intended for testing a single type of vehicle, an appropriate dimensioning of the rollers 1 to 4 would enable the required inertia to be obtained, and a positive coupling of these rollers would permit their movements of rotation to be synchronized. In the more general case in which it is desired to test different types of vehicles, the bench is arranged in such manner as to permit the inertia of the rolling track to be adapted to that of the vehicle in question. This can obviously be achieved by adding or subtracting weights to or from the rotating parts.

The bench may however also be provided for this purpose with a braking system and/or driving system permitting the action on the rollers of a couple proportional to the product of the acceleration (or deceleration) of the rollers and the difference between the mass of the vehicle in question and the equivalent mass corresponding to the total inertia of the rollers and of their equipment about their axes of rotation. The synchronization of the movements, that is to say the coupling and also the adaptation of the inertia of the rolling track to the vehicle under test can be obtained by means of an appropriate system of driving the rollers, for example by an electrical driving system with speed regulation, comprising a group of the Ward-Leonard type.

The test bench further comprises a longitudinal positioning system of the vehicle on the rolling track. This system is especially intended to act on the body of the vehicle in such manner that the centre of gravity G of this latter always remains in the fixed vertical plane which is transverse with respect to the said normal position of the vehicle, such as is shown in FIG. 2. This system thus constitutes a longitudinal abutment which will apply on the said centre of gravity, during the test, a force equal to the resultant of the longitudinal forces which act on the vehicle travelling on a road. In addition, this positioning system serves to permit the action on the vehicle of a restoring couple when this vehicle rotates about a vertical axis during the test. This couple is intended to compensate for the couple which is generated when the contact areas of the wheels are displaced with respect to the upper generator lines of the respective rollers.

This positioning system comprises a transverse frame 10 consisting in the present case of a bridge of triangulated tubular construction which is intended to be fixed to the body of the vehicle, for example to the lower portion of this latter. To this end, there will be employed blocks and clips shown in broken lines in FIG. 1 and having variable height and distance apart, which enable the position of the centre of gravity G of the vehicle to be fixed with respect to the bridge 10. The latter comprises two supporting points A and B, intended to be symmetrically arranged with respect to the centre of gravity G on a single straight line which is disposed horizontally when the vehicle is at rest in the said normal position.

These points are respectively constituted in the form of knuckles 11a, 11b, mounted in shoes 12a, 12b, which slide on the vertical slides 13a, 13b. In addition, means (not shown) are provided to adjust the height of the points A and B with respect to the bridge.

It should be observed that the fixing elements associated with the supporting points A and B are the same, and it will therefore be sufficient to describe below those of the point A only.

The slide 13a on which the point A moves vertically is rigidly fixed to two horizontal arms 14a, 15a, pivoting about a shaft 16a forming one vertical side of a supporting triangle formed by three arms 16a, 17a, 18a. As can be seen from FIG. 1, the upper extremity of the pivotal shaft 16a is rigidly fixed to a shoe 19a sliding on a first horizontal slide 20a, while the lower extremity of this shaft 16a is fixed to a shoe 21a sliding on a second horizontal side 22a. These two slides 20a and 22a are arranged in the same fixed vertical plane passing through the centre of gravity G of the vehicle and disposed transversely with respect to the normal position of this latter.

The third apex of the supporting triangle 16a, 17a, 18a is rigidly fixed to a shoe 23a sliding along a third horizontal slide 24a arranged in another transverse plane parallel to the slides 20a and 22a.

Arms 25a to 28a form a rigid structure with the vertical slide 13a and the pivoted arms 14a, 15a, and a hydraulic jack 29a acts on this structure at the point Pa. As can be seen from FIG. 2, the cylinder of this jack 29a is coupled by means of an articulation 30a to the shoe 23a, while its piston rod is connected to the arms 27a, 28a, by means of an articulation 31a (see FIG. 3) forming the said action point Pa of the jack and movable along an arm 45a in the form of a rail, in order to enable the length of the lever arm of this point about the pivotal shaft 16a to be varied. In addition, a compression spring 32a, the function of which will be explained later, is arranged between the cylinder of the jack 29a on the one hand and the articulation 31a fixed to the said structure, on the other.

As has already been indicated, the elements 10b to 32b associated with the supporting point B correspond to the elements 10a to 32a described above for the point A. As shown in FIGS. 1 and 2, these supporting points A and B are arranged at equal distances from the centre of gravity G of the vehicle, and in the normal position (see FIG. 2) of this latter, their respective fixing elements are disposed symmetrically with respect to the longitudinal and vertical plane passing through this centre of gravity.

Figure 4:
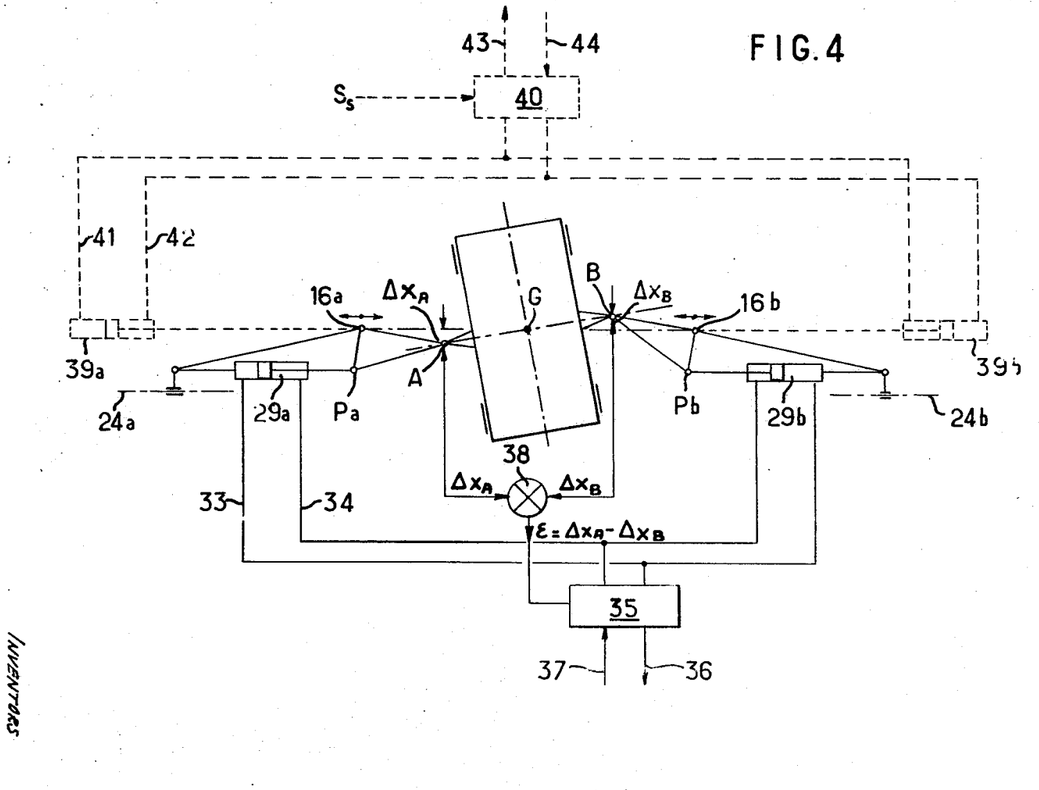
FIG. 4 is an explanatory diagram of the operation of the positioning system of the vehicle on the bench of FIGS. 1 to 3.

The jacks 29a and 28b are controlled in pressure by means of a hydraulic control circuit 33 to 38, as shown in FIG. 4. The purpose of this control is to eliminate any longitudinal component of speed of the centre of gravity G of the vehicle during the test, in order to obtain the longitudinal abutment referred to above.

As shown in FIG. 4, the jacks 29a and 29b are connected in parallel by conduits 33 and 34, so that each displacement of the piston of one has the effect of a displacement in the opposite direction of the piston of the other. In order that they offer a very small resistance to movement, the pistons of the jacks are in the present case of the type with play. In order to correct the error due to leakage, an automatic slide-valve 35 with progressive action serves to connect the conduit 33 selectively to a tank (not shown) through the conduit 36 and the conduit 34 to a source of liquid under pressure (not shown) through the conduit 37.

A measuring device 38 serves to prepare a so-called error signal $\epsilon$ which corresponds to the algebraic difference between the respective longitudinal displacements $\Delta x_A$ and $\Delta x_B$ of the two supporting points A and B with respect to the transverse plane passing through the centre of gravity G of the vehicle. This error signal $\epsilon$ serves to control the slide-valve 35 in such manner that either liquid is evacuated through the conduits 33 and 36, or liquid is brought in through the conduits 37 and 34, until the pistons of the jacks 29a and 29b come into a relative position in which the longitudinal displacements $\Delta x_A$ and $\Delta x_B$ are equal and of opposite sign, the error signal being then zero.

It can therefore be seen that the circuit described above permits the servo-control of the longitudinal positions of the slides 13a and 13b and therefore of the supporting points A and B, so as to maintain the centre of gravity G of the vehicle in the same transverse plane. The hydraulic servo-control of the fixing system described above makes it possible to reduce the friction and vibration of its elements to a minimum when they move during the course of the tests.

FIG. 4 shows in broken lines a hydraulic circuit 39a, 39b and 40 to 44, the operation of which is independent of the positioning system and will be described later.

It should be noted that, when the vehicle turns around a vertical axis during the course of a test, the compression springs 32a and 32b apply a restoring couple. This couple acts at the points Pa and Pb between the supporting triangles 16a to 18a and 16b to 18b on the one hand, and the pivoted arms 14a, 15a and 14b, 15b on the other, and serves to compensate the couple which is created when the vehicle turns with respect to its normal position, and in consequence when the contact areas of the wheels are displaced with respect to the upper generator lines of the respective rollers. As this restoring couple is a function of the vehicle in question, means are provided for varying the points of application Pa and Pb of the springs 32a and 32b.

The positioning system described above thus constitutes a longitudinal abutment which permits the vehicle to effect lateral and vertical movements on the bench, together with rotations due to the pitching and rolling and to the horizontal angular displacement of the vehicle during turns. This system thus leaves the vehicle with five degrees of freedom of movement, namely:

(1) Lateral translation along the tranverse axis.
(2) Vertical translation.
(3) Rotation about the longitudinal axis.
(4) Rotation about the transverse axis.
(5) Rotation about the vertical axis.

By virtue of the fact that the bench described above retains all the degrees of freedom of movement except the longitudinal movement, which the vehicle possesses on the road, this bench makes it possible for the first time to carry out any desired test in situ.

Thus, it is possible to simulate the various conditions of running by providing the bench with means serving to introduce simulation forces acting on the vehicle during the test. In order to simulate the effect on the vehicle of resistance due to air when running on the road, these means may consist of a braking system, the action of which is variable with speed. Similarly, the effects due to a slope or a longitudinal wind can be simulated by the addition or extraction of energy at the level of the rolling track.

In addition, it is possible to simulate the effect on the vehicle of a side wind or of the centrifugal force due to a turning, by applying appropriate lateral forces on the pivotal axes 16a and 16b. To this end, it is possible to utilize for example a hydraulic circuit such as that which is shown in broken lines in FIG. 4. This circuit (39 to 42) comprises two jacks 39a, 39b, arranged so as to act horizontally on the axes 16a and 16b, in the plane of the slides 20a, 22a and 20b, 22b this action being effected as a function of a simulation signal $S_s$ controlling a slide-valve 40 having a progressive action. This latter connects the lines 41 and 42 selectively to the lines 43 and 44 serving respectively for the evacuation of liquid and the intake of liquid under pressure. The slide-valve 40 is arranged in such manner that it puts the line 41 into communication with the line 42 when $S_s = 0$.

For the simulation during the test of the effect of lift on the vehicle, there can be employed two jacks (not shown) one fixed to the front and the other to the rear of the vehicle, for example to the bumpers. These jacks, which are arranged so as to supply at every instant a desired force and lifting couple can be supported on the ground while being capable of moving freely thereon. For this purpose, there will be utilized for example known means serving to produce air cushions between the supporting surfaces of the jacks and the ground, which enables the jacks fixed to the body of the vehicle to follow the movements of this latter during the course of the test.

For the measurement of the reaction forces of the vehicle wheels on the rollers on which they respectively rest, each of the shafts 5 to 8 may be mounted on the trolleys 9a and 9b respectively, for example by means of two dynamometer bearings (not shown), or dynamometer tables.

In the first case, each of these bearings is suspended from thin strips connected in the three directions of space $(x, y, z)$ to a rigid frame, in the present case to one of the trolleys 9a, 9b. The deformation of these strips is proportional to the forces applied on the respective bearings and can be measured by appropriate strain-gauges. Thus, for example, the deformation of the dynamometer strips arranged horizontally and parallel to the longitudinal axis $Gx$ will serve to measure the reaction force $Fr$ which acts during the braking on each roller.

As shown diagrammatically in FIG. 2, the rotation shafts 5, 6 and 7, 8 are respectively connected together by couplings $c_1$, $c_2$. In order to permit the measurement of the reaction forces acting on each of the rollers 1 to 4, these couplings $c_1$ and $c_2$ are of a known type which transmit only torque. There is thus no interaction between the various small translation movements of the rollers 1 to 4.

For the measurement of the resistance of the various strain gauges, there may be employed a potentiometer circuit, and this more particularly in the case where the forces are rather dynamic than static and the effects of temperature variation are negligible. If on the other hand, it is necessary to compensate the effects of temperature, a Wheatstone bridge will be employed for this purpose.

By virtue of the fact that the inertia of the rolling track is adapted to that of the vehicle in question, the speed of the rollers 1 to 4 always corresponds to the "true" speed of the vehicle, that is to say to the speed which the vehicle wheels would have on the road. Thus, the distance travelled and the speed can be easily measured during the test from the movement of revolution of these rollers 1 to 4. Furthermore, the angular and lateral displacements of the vehicle can be measured by means of the fixing system described above, and this by measuring the displacement of its respective elements during the test.

The coefficient of friction of the surface of the rollers is chosen so as to correspond to that of the road to be simulated. It may therefore be envisaged either to provide interchangeable rollers for that purpose or to modify the coefficient of friction of the rollers, for example by fixing more or less rough elements on these latter, or by the application of an appropriate substance.

Figure 5:
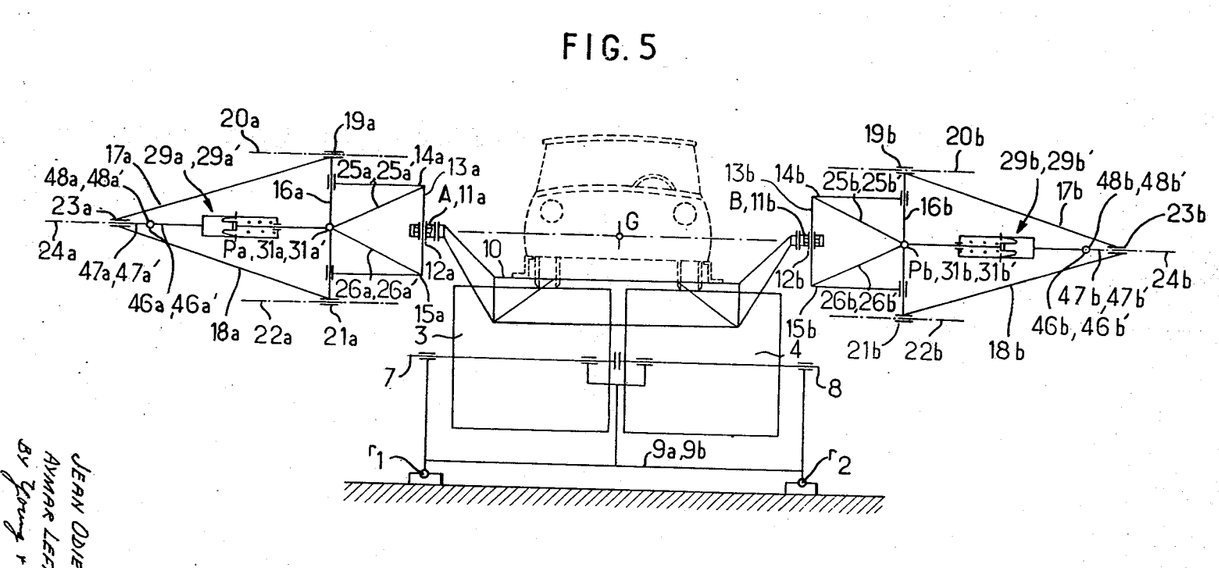
FIG. 5 is a view similar to FIG. 1, but relating to an alternative form of the test-bench.
Figure 6:
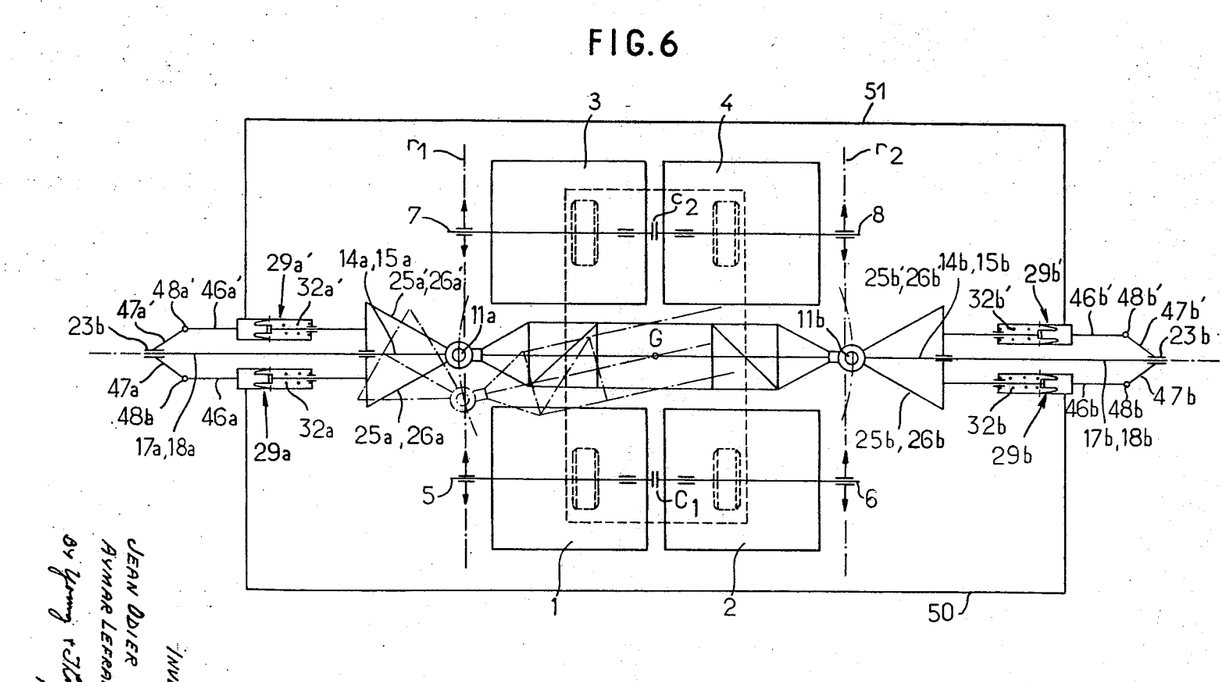
FIG. 6 is a view from above of the alternative form of brench shown in FIG. 5.
Figure 7:
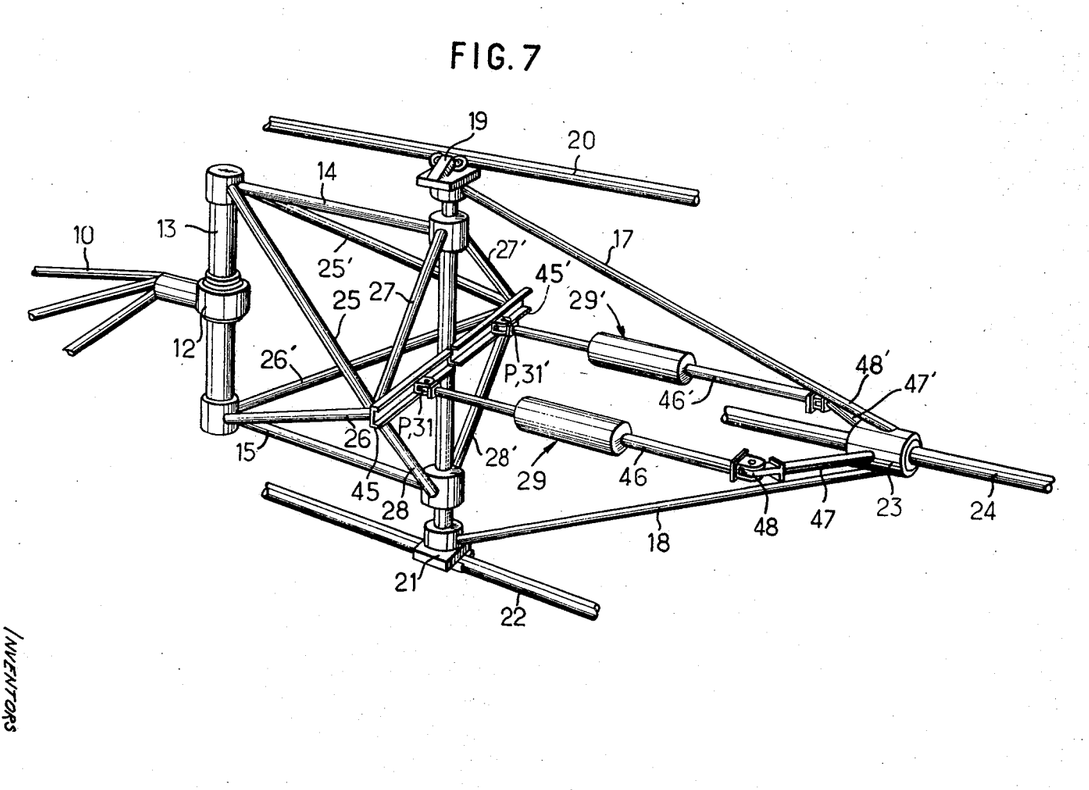
FIG. 7 shows a perspective view of a detail of FIGS. 5 and 6.

Reference will now be made to FIGS. 5 to 7, in which the arrangement and the operation are similar to those which have been described above with reference to FIGS. 1 to 4, and in which the same reference numbers have been adopted to indicate similar elements, but in which the device for positioning the vehicle is modified.

According to the alternative form of construction shown in FIGS. 5 to 7, the horizontal slide 24a which receives the shoe 23a is arranged in the same transverse plane as the slides 20a and 22a.

Arms 25a to 28a on the one hand and 25a' to 28a' on the other form with the slide 13a and the pivoted arms 14a, 15a, two rigid triangulated structures. Two jacks 29a and 29a' act respectively at the points Pa and Pa' on these two structures, through the intermediary of supporting arms 25a, 25a' perpendicular to the pivotal axis 16a (see FIG. 7). These supporting arms 45a and 45a' which in the present case are rails, are respectively coupled to the piston rods of the jacks 29a and 29a' by articulations 31 and 31' located at the points Pa and Pa', while the cylinders of these jacks are connected to the shoe 23a respectively by arms 46a, 47a and 46a', 47a' and articulations 48a and 48a'. The points of action Pa, Pa' of the jacks 29a, 29a' are equidistant from the pivotal axis 16a and their distance from this axis can be adjusted by moving the articulations 31a, 31a' on the respective supporting arms 45a and 45a'. In addition, compression springs 32a and 32a' are respectively arranged in the cylinders of the jacks 29a and 29a'.

These jacks 29a and 29a' are of the type having no leakage and are each provided for that purpose with a sealing diaphragm 49a and 49a' respectively, for example of the so-called Belloframe type. These diaphragms are made in the form of a bell of a non-elastic flexible material, especially of rubberized fabric, and are fixed between the head of the piston and the respective cylinder.

As can be seen from FIG. 6, the jacks 29a and 29a' associated with the fixing system of the supporting point A are connected through conduits 50 and 51 respectively to the jacks 29b and 29b' associated with the fixing system of the point B. Since the jacks 29a, 29a' and 29b, 29b' are of the type without leakage and therefore the hydraulic system has a constant volume of liquid forming a double-acting hydraulic balance, any longitudinal displacement of a supporting point, for example of the point A about the axis 16a, will be transmitted in the opposite direction to the other supporting point B by the positioning system described above. In fact, any angular displacement of one of the pivoted structures results in an angular displacement of the same amount in the opposite direction, of the other. In consequence, the supporting points A and B are caused to pivot about the centre of gravity G of the vehicle in such manner as to keep its longitudinal position fixed during the tests.

As has already been indicated, the elements 10b to 32b and 25b' to 32b' associated with the supporting point B correspond to the elements 10a to 32a and 25a' to 32a' described above for the point A. As shown in FIGS. 5 and 6, these supporting points A and B are arranged at equal distances from the centre of gravity G of the vehicle, and in the normal position (see FIG. 6) of this latter, their respective fixing elements are disposed symmetrically with respect to the longitudinal vertical plane passing through this centre of gravity.

The invention is not limited to the forms of construction described and shown, but includes all alternative forms.

What we claim is:

1. A stationary test-bench for automobile vehicles, especially intended for braking tests, said test-bench comprising four rollers arranged in such manner that each roller supports, preferably on its upper generator line, one of the wheels of the vehicle intended to be tested, the mass equivalent to the total inertia of said rollers about their axes of rotation simulating the mass of said vehicle, an adjustable positioning device to maintain the center of gravity of said vehicle in a fixed transverse vertical plane so as to fix its longitudinal position on said test bench while permitting the vehicle to retain its other degrees of freedom of movement, and means for measuring all the forces acting between the wheels of said vehicle and said rollers.

2. A test-bench as claimed in claim 1, in which said positioning device comprises a rigid frame adapted to be fixed on each side to the body of said vehicle and comprising two lateral supporting points intended to be disposed on the same straight line passing through the center of gravity of said vehicle, at equal distances from said center, said line being transverse with respect to the vehicle and being disposed horizontally when said vehicle is at rest in its normal position in which it is disposed transversely with respect to the axes of the rollers, said two supporting points being constituted by swivel-joints each movable along a vertical slide fixed to two horizontal arms pivoting about a vertical axis capable of displacement in a fixed vertical transverse plane passing through said center of gravity, two hydraulic jacks having their operating fluid controlled by means of an appropriate control circuit and each adapted to act on the horizontal arms associated with one of said slides whereby, during the pivotal movement of said slides about their respective vertical axes, the slides are disposed on each side and at equal distance from said transverse plane so as to prevent any displacement of the center of gravity of said vehicle outside said plane.

3. A test-bench as claimed in claim 2, and further comprising two springs acting on said vertical slides so as to apply a couple to said slides, said couple being capable of compensating that which is created when the contact areas between the wheels of the vehicle and the rollers are displaced angularly with respect to the upper generator lines of the respective rollers.

4. A test-bench as claimed in claim 2, in which two hydraulic jacks are provided so as to cause lateral simulation forces to act on said vertical axes.

5. A test-bench as claimed in claim 1, in which said four rollers are arranged in pairs so as to rotate about two horizontal parallel axes of rotation, the distance between said two axes being adjustable so as to be adapted to the wheel-base of said vehicle.

6. A test-bench as claimed in claim 5, in which the rollers forming each of the said pairs are fixed together for rotation.

7. A test-bench as claimed in claim 1, in which said rollers are of the same diameter which is equal to at least twice the diameter of the wheels of said vehicle.

8. A test-bench as claimed in claim 1, in which the length of said rollers corresponds at least to the width of said vehicle.

9. A test-bench as claimed in claim 1, in which the rotational shafts of said rollers are each mounted in two bearings suspended by dynamometer strips connected in the three directions of space to a rigid frame, said strips each carrying strain gauges, so as to permit the measurement of the reaction forces of the wheels of said vehicle on the respective rollers by which they are supported.

10. A test-bench as claimed in claim 1, and further comprising means for adding energy to said rollers or for taking-off energy from said rollers in order to cause longitudinal simulation forces to act on said vehicle.

11. A test-bench as claimed in claim 1, in which said vehicle-positioning device comprises a rigid frame adapted to be fixed on each side to the body of said vehicle and comprising two lateral supporting points intended to be disposed on the same straight line passing through the center of gravity of said vehicle, at equal distances from said center, said line being transverse with respect to the vehicle and being arranged horizontally when said vehicle is at rest in its normal position in which it is disposed transversely with respect to the axes of the rollers, and said two supporting points being constituted in the form of swivel-joints each movable along a vertical slide fixed to a pair of horizontal arms pivoted about a vertical axis capable of moving in a fixed transverse vertical plane passing through said center of gravity, and in which each of said two slides is rigidly fixed to a pivoted structure on which acts a pair of hydraulic jacks without leakage, the jacks of one pair being hydraulically coupled to the jacks of the other pair, whereby an angular displacement of one of said pivoted structures is transmitted by the pair of jacks associated therewith to the other pair of jacks in order to produce the same angular displacement in the opposite direction, of the other pivoted structure.

References Cited

UNITED STATES PATENTS 3,054,287 9/1962 Lewis ---------------- 73—117
3,180,138 4/1965 Hundley -------------- 73—117

JERRY W. MYRACLE, Primary Examiner

U.S. Cl. X.R.

73—125